United States Patent
Shima

(10) Patent No.: US 8,218,585 B2
(45) Date of Patent: Jul. 10, 2012

(54) LASER OSCILLATOR AND FILTERING METHOD

(75) Inventor: Kensuke Shima, Chiba (JP)

(73) Assignee: Fujikura Ltd., Tokyo (JP)

( * ) Notice: Subject to any disclaimer, the term of this patent is extended or adjusted under 35 U.S.C. 154(b) by 65 days.

(21) Appl. No.: 12/952,740

(22) Filed: Nov. 23, 2010

(65) Prior Publication Data

US 2011/0122902 A1    May 26, 2011

(30) Foreign Application Priority Data

Nov. 25, 2009  (JP) .................. 2009-267337

(51) Int. Cl.
*H01S 3/30* (2006.01)

(52) U.S. Cl. ................. 372/6; 372/19; 372/102; 372/27

(58) Field of Classification Search ............... 372/6, 19, 372/102, 27
See application file for complete search history.

(56) References Cited

U.S. PATENT DOCUMENTS

| 7,177,510 B2 * | 2/2007 | Ramachandran | 385/124 |
| 7,340,139 B2 * | 3/2008 | Ramachandran | 385/124 |
| 2001/0024458 A1 * | 9/2001 | Fermann | 372/6 |

OTHER PUBLICATIONS

Ramachandran, Siddharth and Yan, Man F. "Generation of Radially Polarised Beams from Optical Fibers," Optical Fiber Communication Conference (OFC) Beam Shaping, Microscopy and Device Fabrication (OThV) San Diego, California, Feb. 24, 2008.

* cited by examiner

*Primary Examiner* — Kinam Park
(74) *Attorney, Agent, or Firm* — Westerman, Hattori, Daniels & Adrian, LLP

(57) ABSTRACT

Provided is a fiber laser including a mode filter for selectively attenuating, among modes included in laser light propagating through a multi-mode fiber, any mode other than a radially polarized mode. Among the modes included in the laser light propagating through the multi-mode fiber, the fiber laser causes the radially polarized mode to resonate, so as to emit radially polarized laser light. The mode filter includes a long-period fiber grating obtained by writing, to a multi-mode fiber capable of guiding the radially polarized mode, a grating for selectively attenuating any waveguide mode other than the radially polarized mode.

7 Claims, 2 Drawing Sheets

FIG. 3
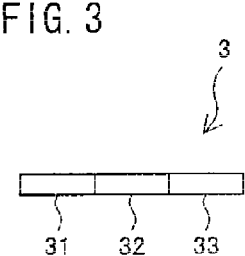
FIG. 4(a)  FIG. 4(b)  FIG. 4(c)
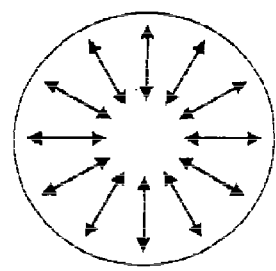 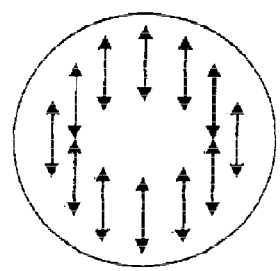 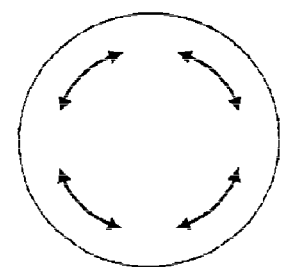
FIG. 5
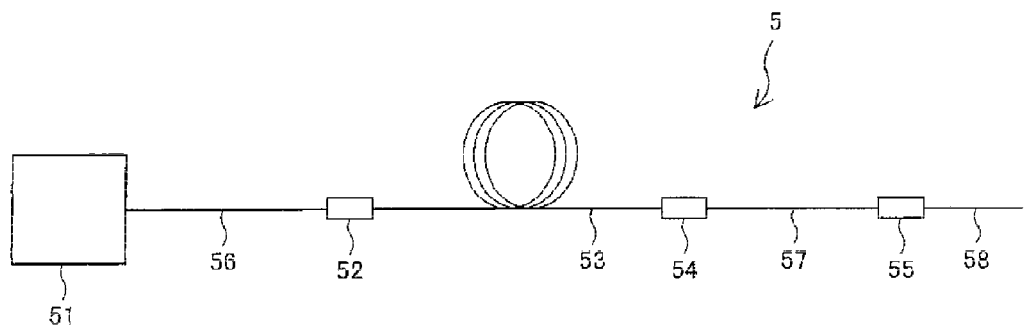

LASER OSCILLATOR AND FILTERING METHOD

This non-provisional application claims priority under 35 U.S.C. §119(a) on Patent Application No. 267337/2009 filed in Japan on Nov. 25, 2009, the entire contents of which are hereby incorporated by reference.

TECHNICAL FIELD

The present invention relates to a laser oscillator for emitting laser light having a specific polarization state. Further, the present invention also relates to a filtering method for selectively attenuating, among modes included in laser light, any mode other than a mode having a specific polarization state.

BACKGROUND ART

In recent years, a laser oscillator for emitting radially polarized laser light attracts attentions. The radially polarized laser light refers to laser light in which an electric field oscillates in a radial direction of a beam spot, as shown in FIG. 4 (*a*). Meanwhile, laser light in which an electric field oscillates in an identical direction as shown in FIG. 4 (*b*) is called linearly polarized laser light; laser light in which an electric field oscillates in an azimuth direction of a beam spot as shown in FIG. 4 (*c*) is called azimuthally polarized laser light; and laser light in which an electric field oscillates in random directions is called randomly polarized laser light. The radially polarized laser light has a smaller spot size at a focal point, as compared with laser light having other polarization states. Therefore, the radially polarized laser light has an advantage of providing high processing efficiency when used in laser processing.

The radially polarized laser light can be generated by using, for example, a microbend fiber grating (see Patent Literature 1 and Non-Patent Literature 1). The microbend fiber grating is an optical element realized by causing a spatially periodic external force to act on an optical fiber from opposite directions alternately with use of two stressors on which recesses and protrusions are provided in a spatially periodic manner. The microbend fiber grating converts, into radially polarized laser light, laser light having a wavelength corresponding to the spatial period of the external force.

FIG. 5 shows a configuration of a conventional laser oscillator 5 which emits radially polarized laser light. The laser oscillator 5 is a laser oscillator including, as a laser cavity, an optical fiber 53 whose both ends are terminated by a mirror 52 and a half mirror 54, respectively. Further, the laser oscillator 5 converts laser light outputted from the laser cavity, into radially polarized laser light with use of a microbend fiber grating 55.

The optical fiber 53, which serves as an amplification medium in the laser oscillator 5, is an active fiber including a core doped with a rare earth element. Upon absorbing pumping light, the rare earth element is transferred to a state of population inversion. When pumping light emitted by a light source 51 enters the optical fiber 53 via an optical fiber 56, laser light is generated by stimulated emission from the rare earth element, which has been transferred to the state of population inversion.

One end of the optical fiber 53 on the light source 51 side is terminated by the mirror 52, which transmits the pumping light emitted by the light source 51 and which reflects, at a certain reflectance, the laser light generated by stimulated emission from the rare earth element. On the other hand, the other end of the optical fiber 53, which end is located on the opposite side to the light source 51, is terminated by the half mirror 54, which reflects, at a certain reflectance, the laser light generated by stimulated emission from the rare earth element and which transmits, at a certain transmittance, the laser light generated by stimulated emission from the rare earth element.

Consequently, the laser light generated by stimulated emission from the rare earth element resonates within the optical fiber 53 and is amplified recursively. Then, part of the laser light amplified recursively within the optical fiber 53 is transmitted through the half mirror 54 and outputted to the outside of the optical fiber 53.

Note that the optical fiber 53 is a single-mode fiber, which is capable of confining a fundamental mode only. Here, the fundamental mode refers to a mode whose light intensity distribution in a cross section of an optical fiber has no node. Typically, in the case of the fundamental mode, the light intensity distribution in the cross section of the optical fiber takes a single-peaked pattern. The fundamental mode is a waveguide mode constituted by two linearly polarized components whose polarization directions are orthogonal to each other. Thus, the laser light, which is transmitted through the half mirror 54 and outputted to the outside of the optical fiber 53, includes the two linearly polarized components mixed together. However, within the optical fiber 53, a phase difference between the two linearly polarized components is not determined to a certain value. Furthermore, within the optical fiber 53, wavelengths of the respective two linearly polarized components can be different from each other. Moreover, within the optical fiber 53, the two linearly polarized components can be coupled to each other. Therefore, the laser light which is transmitted through the half mirror 54 and outputted to the outside of the optical fiber 53 typically becomes a randomly polarized wave.

The fundamental-mode laser light which is transmitted through the half mirror 54 and outputted to the outside of the optical fiber 53 is guided to the microbend fiber grating 55 via an optical fiber 57. The microbend fiber grating 55 converts the fundamental-mode laser light entered, into radially polarized laser light. The radially polarized laser light which is outputted from the microbend fiber grating 55 is guided to an optical fiber 58, and is then outputted to the outside from an end of the optical fiber 58, which end is located on the opposite side to the microbend fiber grating 55.

CITATION LIST

[Patent Literature]
 [Patent Literature 1]
 U.S. Pat. No. 7,177,510 B2
[Non-Patent Literature]
 [Non-Patent Literature 1]
 S. Ramachandran, et al., "Generation of Radially Polarised Beams from Optical Fibers", Paper # OThV2 at OFC/NFOEC, 2008

SUMMARY OF INVENTION

Technical Problem

However, since the conventional laser oscillator for emitting radially polarized laser light uses the microbend fiber grating, the conventional laser oscillator involves the following problems (1) through (4):

(1) Low Resistance to Physical Disturbance

If a variation occurs in the spatial period of the external force to be acted on the optical fiber which is used to form the microbend fiber grating, the conversion efficiency drops. This is because that, if the spatial period of the external force changes, this causes a change in a wavelength of fundamental-mode laser light which is to be converted into radially polarized laser light by the microbend fiber grating. Thus, the conventional laser oscillator has a problem that, when subjected to a physical disturbance (e.g., a vibration or a shock), the conventional laser oscillator generates radially polarized laser light with a lower intensity or cannot generate radially polarized laser light.

(2) High Manufacturing Cost

The spatial period of the external force to be acted on the optical fiber which is used to form the microbend fiber grating is determined not only by the wavelength of the fundamental-mode laser light to be converted, but also by the optical characteristics of the optical fiber to be used. Therefore, in a case where optical fibers each of which is used to form a microbend fiber grating have different optical characteristics, it is necessary to prepare, for each of the optical fibers, a stressor which suits the optical characteristics of the respective optical fiber. Furthermore, in a case where the optical characteristics of an optical fiber to be used are not uniform over its longitudinal direction, it is necessary to prepare, for each part of the optical fiber to be used, a stressor which suits the optical characteristics of the respective part of the optical fiber. These cases cause the problem of increasing the manufacturing cost of a microbend fiber grating, thereby leading to the problem of increasing the manufacturing cost of a laser oscillator including the microbend fiber grating.

(3) Low Reliability

The optical fiber which is used to form the microbend fiber grating is easy to break, since such the optical fiber is subjected to a mechanical external force given by the stressors. This causes the problem of a reduction in long-term reliability of a microbend fiber grating, thereby leading to the problem of a reduction in long-term reliability of a laser oscillator including the microbend fiber grating.

(4) Difficulty in Realizing Higher Power Output

In order to emit fundamental-mode laser light with use of a fiber laser, it is necessary to cause the fundamental mode to resonate within an optical fiber. However, the fundamental mode is a waveguide mode whose intensity increases at a position close to an axis of the optical fiber. Therefore, if the intensity of the fundamental-mode laser light to be emitted is increased, a nonlinear optical phenomenon such as stimulated Raman scattering or stimulated Brillouin scattering occurs. This causes (i) a loss or (ii) a variation in the wavelength of the laser light. Thus, emitting the fundamental-mode laser light with use of the fiber laser involves the problem of difficulty in realizing a higher power output.

The present invention was made in view of the foregoing problems, and an object of the present invention is to provide a laser oscillator for emitting laser light having a specific polarization state (e.g., radially polarized laser light), without use of a microbend fiber grating.

Solution to Problem

In order to attain the foregoing object, a laser oscillator of the present invention is a laser oscillator for emitting laser light generated by stimulated emission within an active medium, said laser oscillator including: a mode filter for selectively attenuating, among modes included in the laser light propagating through the active medium, any mode other than a mode having a specific polarization state, the mode filter including a long-period fiber grating obtained by writing, to a multi-mode fiber which is capable of guiding a waveguide mode having the specific polarization state, a grating for selectively attenuating any waveguide mode other than the waveguide mode having the specific polarization state.

According to the above configuration, among the modes included in the laser light propagating through a laser cavity, the mode having the specific polarization state resonates within the laser cavity and is then outputted to the outside of the laser cavity, without being attenuated by the mode filter. On the other hand, among the modes included in the laser light propagating through the laser cavity, any mode other than the mode having the specific polarization state is attenuated by the mode filter, so as to be hardly outputted to the outside of the laser cavity. Furthermore, the function of the mode filter for selectively attenuating any mode other than the mode having the specific polarization state is realized by the long-period fiber grating, which is included in the mode filter. Thus, the above configuration provides an effect of making it possible to emit the laser light having the specific polarization state, without use of a microbend fiber grating.

In addition, according to the above configuration, by writing, to a multi-mode fiber which is capable of guiding the waveguide mode having the specific polarization state, a grating for attenuating any waveguide mode other than the waveguide mode having the specific polarization state, it is possible to manufacture a mode filter which selectively attenuates any mode other than the mode having the specific polarization state. Thus, the above configuration provides a further effect of making it possible to manufacture a highly-accurate mode filter for selectively attenuating a desired waveguide mode, i.e., for selectively attenuating a mode having a desired polarization state.

In order to attain the foregoing object, a filtering method of the present invention is a filtering method for selectively attenuating, among modes included in laser light, any mode other than a mode having a specific polarization state, said method including the step of: selectively attenuating any mode other than the mode having the specific polarization state, with use of a long-period fiber grating obtained by writing, to a multi-mode fiber which is capable of guiding a waveguide mode having the specific polarization state, a grating for selectively attenuating any waveguide mode other than the waveguide mode having the specific polarization state.

According to the above configuration, it is possible to selectively attenuate any mode other than the mode having the specific polarization state, with use of the long-period fiber grating obtained by writing, to the multi-mode fiber which is capable of guiding the waveguide mode having the specific polarization state, the grating for attenuating any waveguide mode other than the waveguide mode having the specific polarization state. Thus, the above configuration makes it possible to perform, with a high accuracy, a filtering method for selectively attenuating a desired waveguide mode, i.e., for selectively attenuating a mode having a desired polarization state.

Advantageous Effects of Invention

As described above, a laser oscillator of the present invention includes a mode filter for selectively attenuating, among modes included in laser light propagating through an active medium, any mode other than a mode having a specific polarization state. Further, the mode filter, included in the laser oscillator of the present invention, includes a long-period fiber grating obtained by writing, to a multi-mode fiber which is capable of guiding the waveguide mode having the specific polarization state, a grating for selectively attenuating any waveguide mode other than the waveguide mode having the specific polarization state. According to this, it is possible to emit laser light having the specific polarization state, without use of a microbend fiber grating.

BRIEF DESCRIPTION OF DRAWINGS

FIG. 2 (b) is a graph illustrating a refractive index distribution of the optical fiber which is used to form the long-period fiber grating, which refractive index distribution is observed along a radial direction of the optical fiber.

FIG. 2 (c) is a side view of the optical fiber which is used to form the long-period fiber grating.

FIG. 3 is a view illustrating a configuration of a mode filter included in the fiber laser shown in FIG. 1.

FIG. 4 (a) is a view schematically illustrating a direction in which an electric field in radially polarized laser light oscillates.

FIG. 4 (b) is a view schematically illustrating a direction in which an electric field in linearly polarized laser light oscillates.

FIG. 4 (c) is shows a view schematically illustrating a direction in which an electric field in azimuthally polarized laser light oscillates.

FIG. 5 is a view schematically illustrating a configuration of a conventional laser oscillator for emitting radially polarized laser light.

DESCRIPTION OF EMBODIMENTS

The following will describe a laser oscillator of the present embodiment with reference to drawings. Note that the laser oscillator of the present embodiment is realized as a laser oscillator including, as a laser cavity, an optical fiber whose both ends are terminated by a mirror and a half mirror, respectively. That is to say, the laser oscillator of the present embodiment is realized as a fiber laser. Hereinafter, the laser oscillator of the present embodiment is referred to as "fiber laser".

(Configuration of Fiber Laser)

Figure 1:
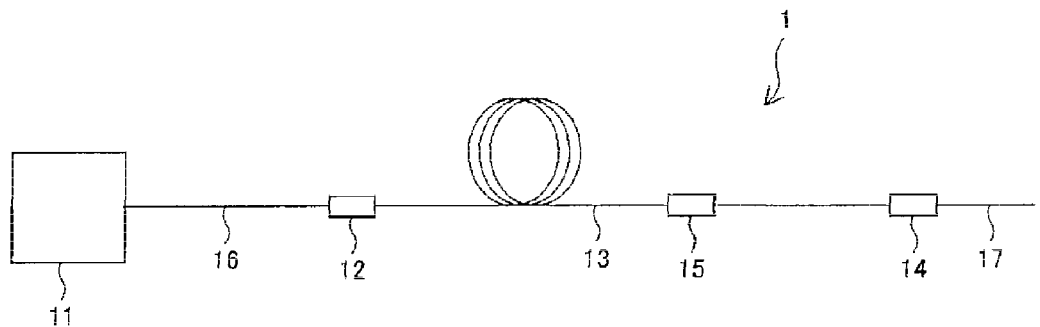
FIG. 1 is a view illustrating a configuration of a fiber laser according to an embodiment of the present invention.

With reference to FIG. 1, the following will describe a configuration of a fiber laser 1 of the present embodiment. FIG. 1 is a view illustrating the configuration of the fiber laser 1 of the present embodiment. As shown in FIG. 1, the fiber laser 1 includes a light source 11, a mirror 12, a multi-mode fiber 13, a half mirror 14, and a mode filter 15.

The fiber laser 1 is a laser oscillator including, as a laser cavity, the multi-mode fiber 13 whose both ends are terminated by the mirror 12 and the half mirror 14, respectively. The multi-mode fiber 13, which serves as an amplification medium in the fiber laser 1, is an active fiber including a core doped with a laser medium, the laser medium being transferred to a state of population inversion upon absorbing pumping light. When the pumping light enters the multi-mode fiber 13, laser light is generated by stimulated emission from the laser medium, which has been transferred to the state of population inversion.

Examples of a suitable laser medium to be doped to the core of the multi-mode fiber 13 encompass rare earth elements such as ytterbium, erbium, praseodymium, and bismuth. For example, in a case where the core of the multi-mode fiber 13 is doped with ytterbium, causing pumping light having a wavelength of 900 nm or more and 980 nm or less to enter the multi-mode fiber 13 results in stimulated emission of laser light having a wavelength of 1030 nm or more and 1090 nm or less from ytterbium, which has been transferred to the state of population inversion.

The light source 11 is a light source for emitting pumping light which causes the laser medium doped to the core of the multi-mode fiber 13 to be transferred to the state of population inversion. The light source 11 is, for example, a semiconductor laser. In a case where the core of the multi-mode fiber 13 is doped with ytterbium, a semiconductor laser which emits, as pumping light, laser light having a wavelength of 915 nm may be used as the light source 11, for example. The light source 11 and the mirror 12 are connected with each other via an optical fiber 16, through which the pumping light propagates. The pumping light emitted by the light source 11 enters the mirror 12 via the optical fiber 16.

One end of the multi-mode fiber 13 on the light source 11 side (i.e., the end on the left in FIG. 1) is terminated by the mirror 12, which transmits the pumping light emitted by the light source 11 and which reflects, at a certain reflectance, laser light generated by stimulated emission from the laser medium. On the other hand, the other end of the multi-mode fiber 13, which end is located on the opposite side to the light source 11 (i.e., the end on the right in FIG. 1), is terminated by the half mirror 14, which reflects, at a certain reflectance, the laser light generated by stimulated emission from the laser medium and which transmits, at a certain transmittance, the laser light generated by stimulated emission from the laser medium.

Consequently, the laser light generated by stimulated emission from the laser medium resonates within the multi-mode fiber 13 and is amplified recursively. Then, part of the laser light amplified recursively within the multi-mode fiber 13 is transmitted through the half mirror 14, and is outputted to the outside of the multi-mode fiber 13. The half mirror 14 is connected with an optical fiber 17. The laser light which is transmitted through the half mirror 14 and outputted to the outside of the multi-mode fiber 13 is outputted from an end of the optical fiber 17 which end is located on the opposite side to the half mirror 14.

Characteristic points of the fiber laser 1 of the present embodiment encompass (1) using, as an amplification medium, the multi-mode fiber 13 which is capable of guiding (i.e., confining) a mode constituted by a radially polarized component (e.g., TM01 mode); and (2) providing the multi-mode fiber 13 with the mode filter 15 which selectively attenuates, among modes included in laser light propagating through the multi-mode fiber 13, any mode (i.e., a mode including a polarized component other than a radially polarized component) other than the mode constituted by the radially polarized component.

The present embodiment uses, as the multi-mode fiber 13, an optical fiber which is capable of guiding modes which are not higher than at least second order. That is, the present embodiment uses, as the multi-mode fiber 13, an optical fiber which is capable of guiding at least (i) one fundamental mode called the HE11 mode and (ii) three second-order modes called the TM01 mode, the TE01 mode, and the HE21 mode, respectively.

Here, the HE11 mode refers to a waveguide mode constituted by two linearly polarized components whose polarization directions are orthogonal to each other; the TM01 mode refers to a waveguide mode constituted by a radially polarized component; the TE01 mode refers to a waveguide mode constituted by an azimuthally polarized component; and the HE21 mode refers to a waveguide mode constituted by a radially polarized component and an azimuthally polarized component.

Thus, the laser light propagating through the multi-mode fiber 13 can include, in addition to the fundamental mode constituted by the linearly polarized components, a higher-order mode constituted by a radially polarized component (hereinafter, this mode is referred to as "radially polarized mode") and a higher-order mode constituted by an azimuthally polarized component (hereinafter, this mode is referred to as "azimuthally polarized mode"). However, since the multi-mode fiber 13 is provided with the mode filter 15, which selectively attenuates any waveguide mode other than the radially polarized mode, a waveguide mode which resonates and is amplified recursively within the multi-mode fiber 13 is only the radially polarized mode. Therefore, the laser light which is transmitted through the half mirror 14 and outputted to the outside of the multi-mode fiber 13 becomes radially polarized laser light.

Such the mode filter 15 can be realized by using a long-period fiber grating, for example. A configuration of the mode filter 15 including the long-period fiber grating will be described later with reference to another drawing.

As described previously, the fiber laser 1 of the present embodiment causes, among the modes included in the laser light propagating through the multi-mode fiber 13, the radially polarized mode to resonate and be amplified recursively. Therefore, the mirror 12 only needs to reflect, at a certain reflectance, the radially polarized mode among the modes included in the laser light propagating through the multi-mode fiber 13. Further, the half mirror 14 only needs to reflect, at a certain reflectance, the radially polarized mode among the modes included in the laser light propagating through the multi-mode fiber 13 and to transmit, at a certain transmittance, the radially polarized mode among the modes included in the laser light propagating through the multi-mode fiber 13.

Such the mirror 12 and the half mirror 14 can be achieved by, e.g., a fiber Bragg grating. Here, the "fiber Bragg grating" refers to an optical fiber in which a refractive index difference between a core and a cladding changes periodically along a longitudinal direction of the optical fiber and which selectively reflects laser light having a wavelength corresponding to the period (Bragg reflection). (Typically, the periodic change in the refractive index difference between the core and the cladding is given by changing only the refractive index of the core.)

Usable as the mirror 12 may be, for example, a fiber Bragg grating obtained by writing, to an optical fiber which is capable of guiding (confining) modes which are not higher than at least second order, a grating by which a reflectance with respect to the TM01 mode (i.e., a reflectance at a wavelength of laser light generated by stimulated emission from the laser medium) becomes 95% or more. In this case, a reflectance with respect to a waveguide mode other than the TM01 mode may be different from the reflectance with respect to the TM01 mode.

Usable as the half mirror 14 may be, for example, a fiber Bragg grating obtained by writing, to an optical fiber capable of guiding (confining) modes which are not higher than at least second order, a grating by which a reflectance with respect to the TM01 mode (i.e., a reflectance at a wavelength of laser light generated by stimulated emission from the laser medium) becomes approximately 10%, i.e., by which a transmittance with respect to the TM01 mode becomes approximately 90%. In this case, a reflectance and a transmittance with respect to a waveguide mode other than the TM01 mode may be different from the reflectance and the transmittance with respect to the TM01 mode.

Note that (i) the reflectance of the mirror 12 with respect to the TM01 mode and (ii) the reflectance and the transmittance of the half mirror 14 with respect to the TM01 mode are not limited to the above-described values. Namely, (i) the reflectance of the mirror 12 with respect to the TM01 mode and (ii) the reflectance and the transmittance of the half mirror 14 with respect to the TM01 mode may be set to values which are outside of the range of the above-described values, as long as the values are within a range allowing the fiber laser to emit laser light in a steady manner.

As exemplified in the present embodiment, each of the mirror 12, the multi-mode fiber 13, the half mirror 14, and the mode filter 15, which constitute the laser cavity, can be constituted by a multi-mode fiber. These members can be constituted by multi-mode fibers having the same optical characteristics or by multi-mode fibers having different optical characteristics. The fiber laser 1 may be manufactured in such a manner that (i) the above members are individually produced and thereafter the members produced are integrated into one by fusion or (ii) gratings corresponding to the respective members are written into a single multi-mode fiber.

In the present embodiment, the fiber laser 1 for emitting radially polarized laser light has explained. However, it is also possible to realize, in a similar manner, a fiber laser for emitting fundamental-mode laser light and a fiber laser for emitting azimuthally polarized laser light.

For example, assume a case where, in the configuration shown in FIG. 1, the multi-mode fiber 13 is provided with a mode filter which selectively attenuates any waveguide mode other than the fundamental mode, instead of the mode filter 15 which selectively attenuates any waveguide mode other than the radially polarized mode. With this configuration, it is possible to realize a fiber laser for emitting fundamental-mode laser light. For another example, assume a case where the multi-mode fiber 13 is provided with a mode filter which selectively attenuates any waveguide mode other than the azimuthally polarized mode, instead of the mode filter 15 which selectively attenuates any waveguide mode other than the radially polarized mode. With this configuration, it is possible to realize a fiber laser for emitting azimuthally polarized laser light.

In the present embodiment, the laser oscillator including the optical fiber as the laser cavity has been explained. However, the present invention is not limited to this. Namely, the present invention is applicable to laser oscillators including, as laser cavities, active media (amplification media) other than an optical fiber. The present invention is also applicable to any of solid lasers, liquid lasers, gas lasers, and semiconductor lasers.

(Configuration of Mode Filter)

Figure 2A:
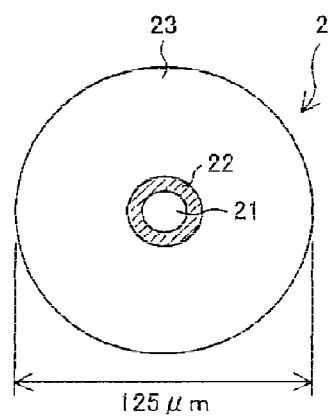
FIG. 2 (a) is a cross-sectional view of an optical fiber which is used to form a long-period fiber grating.
Figure 2C:
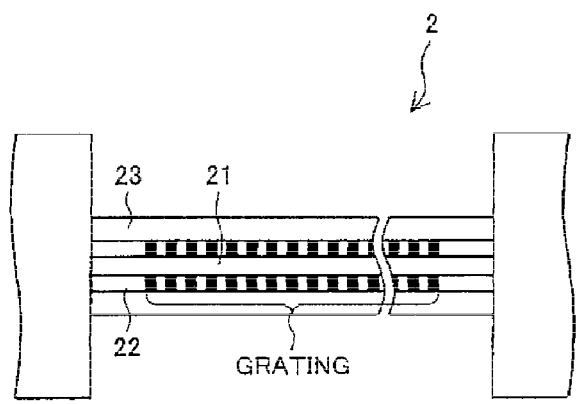
Figure 2B:
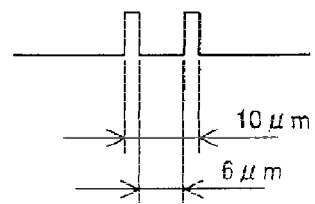

Next, with reference to FIGS. 2 and 3, the following will describe a configuration of the mode filter including the long-period fiber grating. Note that the "long-period fiber grating" refers to an optical fiber in which a refractive index difference between a core and a cladding changes periodically along a longitudinal direction of the optical fiber and which selectively attenuates a waveguide mode having an effective refractive index corresponding to the period. (Typically, the periodic change in the refractive index difference between the core and the cladding is given by changing only the refractive index of the core.) Note also that giving, to a refractive index difference between a core and a cladding, a periodic change along a longitudinal direction of an optical fiber is expressed as "writing a grating" herein.

FIG. 2 (a) is a cross-sectional view of an optical fiber 2 which is used to form the long-period fiber grating; FIG. 2 (b) is a graph illustrating a refractive index distribution of the optical fiber 2, which refractive index distribution is observed along a radial direction of the optical fiber 2; and FIG. 2 (c) is a side view of the optical fiber 2.

When viewed in the cross-section shown in FIG. 2 (a), the optical fiber 2, which is used to form the long-period fiber grating, has a cross-sectional configuration including a center region 21 having a disc shape, a high-refractive index region 22 having an annular shape and surrounding the center region 21, and a cladding 23 surrounding the high-refractive index region 22. The high-refractive index region 22 is doped with germanium. Further, as shown in FIG. 2 (b), the high-refractive index region 22 has a higher refractive index than those of the center region 21 and the cladding 23, which surrounds the high-refractive index region 22.

In the present embodiment, a region surrounded by the outer circumference of the high-refractive index region 22 (i.e., the region constituted by the center region 21 and the high-refractive index region 22) is referred to as a core. In other words, the high-refractive index region 22 is provided in an outer circumference region of the core. In the configuration exemplified in FIGS. 2 (a) and (b), the optical fiber 2 has a diameter of 125 μm, the center region 21 has a diameter of 6 μm, the high-refractive index region 22 has a thickness of 2 μm, and the core has a diameter of 10 μm.

All of the center region 21, the high-refractive index region 22, and the cladding 23 are made of quartz. However, the high-refractive index region 22 is doped with germanium. Therefore, as shown in FIG. 2 (c), if a covering (jacket) of the optical fiber 2 is partially removed and an exposed part of the core wire is irradiated with an ultraviolet ray, a refractive index of the part of the high-refractive index region 22 irradiated with the ultraviolet ray becomes higher than that of a part of the high-refractive index region 22 which is not irradiated with the ultraviolet ray. In this case, typically, the ultraviolet ray to be emitted to the exposed part of the core wire has a wavelength of approximately 240 nm to approximately 250 nm. For details of a method for manufacturing a long-period fiber grating, see Japanese Unexamined Patent Application Publication, Tokukai, No. 2000-249851 A, for example.

A period Λ of the grating to be written may be set so as to satisfy the following Formula (1). This makes it possible to realize a long-period fiber grating having the following nature: (i) in response to laser light of a wavelength λ (i.e., a wavelength in vacuum) being entered thereto, the long-period fiber grating causes (a) a waveguide mode propagating through the core and having an effective refractive index n1 to be coupled to (b) a cladding mode propagating through the cladding 23 and having an effective refractive index n2; (ii) the long-period fiber grating selectively attenuates the waveguide mode propagating through the core.

$$\lambda = \Lambda |n1 - n2| \qquad (1)$$

Here, the effective refractive index n1 of the waveguide mode refers to a refractive index defined by $n1 = \lambda/\lambda1$, where λ1 represents a z-axis component of a wavelength of the waveguide mode in the core. The effective refractive index n2 of the cladding mode refers to a refractive index defined by $n2 = \lambda/\lambda2$, where λ2 represents a z-axis component of a wavelength of the cladding mode in the cladding 23. Here, the z axis means an axis extending along a longitudinal direction of the optical fiber 2.

FIG. 3 is a view illustrating a configuration of a mode filter 3 including a long-period fiber grating. The mode filter 3 shown in FIG. 3 is obtained by writing, to a multi-mode fiber which is capable of guiding the radially polarized mode, a grating for attenuating any waveguide mode other than the radially polarized mode.

The mode filter 3 can be configured by connecting long-period fiber gratings with each other, which long-period fiber gratings selectively attenuate respective waveguide modes other than the radially polarized mode. Assume a case where an optical fiber used to form a long-period fiber grating is an optical fiber capable of guiding (confining) modes which are not higher than second order. In this case, as shown in FIG. 3, it is possible to obtain the mode filter 3 by connecting three long-period fiber gratings 31 through 33 with each other, each of which long-period fiber gratings 31 through 33 selectively attenuates, among the modes which are not higher than second order, a respective one of three waveguide modes other than the TM01 mode.

In FIG. 3, a period of a grating written to the long-period fiber grating 31 is set so as to selectively attenuate the HE11 mode at the wavelength λ. Further, a period of a grating written to the long-period fiber grating 32 is set so as to selectively attenuate the TE01 mode at the wavelength λ. Furthermore, a period of a grating written to the long-period fiber grating 33 is set so as to selectively attenuate the HE21 mode at the wavelength λ. Therefore, when laser light having the wavelength λ enters the mode filter 3, each of the waveguide modes other than the radially polarized mode is attenuated by a corresponding one of the long-period fiber gratings 31 through 33. Note that the periods of the gratings written to the respective long-period fiber gratings 31 through 33 are set so as not to cause the TM01 mode to be coupled to the cladding. Consequently, the radially polarized mode is transmitted through the mode filter 3 without being attenuated.

For example, assume a case where (i) an optical fiber to which a grating is to be written has the same configuration and the same optical characteristics as those of the optical fiber 2 shown in FIG. 2 and (i) the wavelength λ (i.e., a wavelength in vacuum) of laser light to enter the mode filter 3 is 1064 nm. In this case, a period of a grating to be written to the long-period fiber grating 31, which selectively attenuates the HE11 mode, is 602 μm; a period of a grating to be written to the long-period fiber grating 32, which selectively attenuates the TE01 mode, is 1190 μm; and a period of a grating to be written to the long-period fiber grating 33, which selectively attenuates the HE21 mode, is 1197 μm. It is sufficient that a grating including approximately 60 highly refractive regions is written to each of the long-period fiber gratings 31 through 33.

FIG. 3 shows a configuration in which the long-period fiber gratings 31 through 33 are connected with each other in the order of the long-period fiber grating 31, the long-period fiber grating 32, and the long-period fiber grating 33 from a light incident side. However, the mode filter 3 is not limited to this configuration. The long-period fiber gratings 31 through 33 may be connected with each other in any order. For example, the long-period fiber gratings 31 through 33 may be connected with each other in the order of the long-period fiber grating 32, the long-period fiber grating 31, and the long-period fiber grating 33 from the light incident side.

Further, FIG. 3 shows a configuration in which gratings corresponding to effective refractive indexes of respective waveguide modes other than the radially polarized mode are separately written to the three long-period fiber gratings 31 through 33, respectively. However, the configuration of the mode filter 3 is not limited to this. Alternatively, such a configuration may be employed in which gratings corresponding to effective refractive indexes of respective waveguide modes other than the radially polarized mode are written to a single long-period fiber grating overlappedly.

Furthermore, an optical fiber which can be used to form the long-period fiber grating included in the mode filter 3 is not limited to the optical fiber capable of guiding modes which are not higher than second order. Alternatively, it is possible to obtain the mode filter 3 also with a long-period fiber grating including an optical fiber capable of guiding modes which are not higher than nth order (n is an integer of 3 or greater). In this case, an additional long-period fiber grating for attenuating a waveguide mode other than the radially polarized mode may be provided to the configuration shown in FIG. 3.

In the present embodiment, the foregoing has explained the mode filter 3 for selectively attenuating any waveguide mode other than the radially polarized mode. Not only this, it is possible to realize, in a similar manner, a mode filter for selectively attenuating any waveguide mode other than the fundamental mode, a mode filter for selectively attenuating any waveguide mode other than the azimuthally polarized mode, etc.

For example, the mode filter for selectively attenuating any waveguide mode other than the fundamental mode can be obtained by connecting long-period fiber gratings with each other, which long-period fiber gratings selectively attenuate respective waveguide modes other than the fundamental mode (e.g., the HE11 mode). Further, the mode filter for selectively attenuating any waveguide mode other than the azimuthally polarized mode can be achieved by connecting long-period fiber gratings with each other, which long-period fiber gratings selectively attenuate respective waveguide modes other than the azimuthally polarized mode (e.g., the TE01 mode).

[Summary]

As described above, a laser oscillator of the present invention is a laser oscillator for emitting laser light generated by stimulated emission within an active medium, said laser oscillator including: the active medium, a mode filter for selectively attenuating, among modes included in the laser light propagating through the active medium, any mode other than a mode having a specific polarization state, the mode filter including a long-period fiber grating obtained by writing, to a multi-mode fiber which is capable of guiding a waveguide mode having the specific polarization state, a grating for selectively attenuating any waveguide mode other than the waveguide mode having the specific polarization state.

According to the above configuration, among the modes included in the laser light propagating through the active fiber, the mode having the specific polarization state resonates within a laser cavity and is then outputted to the outside of the laser cavity, without being attenuated by the mode filter. On the other hand, among the modes included in the laser light propagating through the active medium, any mode other than the mode having the specific polarization state is attenuated by the mode filter, so as to be hardly outputted to the outside of the laser cavity. Furthermore, the function of the mode filter for selectively attenuating any mode other than the mode having the specific polarization state is realized by the long-period fiber grating, which is included in the mode filter. Thus, the above configuration provides an effect of making it possible to emit the laser light having the specific polarization state, without use of a microbend fiber grating.

In addition, according to the above configuration, by writing, to a multi-mode fiber which is capable of guiding the waveguide mode having the specific polarization state, a grating for attenuating any waveguide mode other than the waveguide mode having the specific polarization state, it is possible to manufacture a mode filter which selectively attenuates any mode other than the mode having the specific polarization state. The writing of the grating can be performed by, e.g., emitting an ultraviolet ray to the multi-mode fiber including a core doped with germanium. Thus, the above configuration provides a further effect of making it possible to manufacture a highly-accurate mode filter for selectively attenuating a desired waveguide mode, i.e., a highly-accurate mode filter for selectively attenuating a mode having a desired polarization state.

In the laser oscillator of the present invention, it is preferable that the long-period fiber grating included in the mode filter is obtained by writing, to a multi-mode fiber which is capable of guiding waveguide modes which are not higher than second order, gratings for selectively attenuating a HE11 mode, a TE01 mode, and a HE21 mode, respectively.

According to the above configuration, in a case where the laser cavity is a multi-mode fiber or a series of multi-mode fibers capable of guiding the TM01 mode, the TM01 mode (the radially polarized mode) among the modes included in the laser light propagating through the active fiber resonates within the laser cavity and is then outputted to the outside of the laser cavity without being attenuated by the mode filter. On the other hand, in such the case, among the modes included in the laser light propagating through the active fiber, the HE11 mode (fundamental mode), the TE01 mode (azimuthally polarized mode), and the HE21 mode (mode constituted by a radially polarized component and an azimuthally polarized component) are attenuated by the mode filter, so as to be hardly outputted to the outside of the laser cavity. Furthermore, among the modes included in the laser light propagating through the active fiber, a higher-order mode equal to or higher than third order is not guided by the mode filter; consequently, such the higher-order mode is hardly outputted to the outside of the laser cavity. Thus, the above configuration provides a further effect of making it possible to emit radially polarized laser light without use of a microbend fiber grating.

Even in a case where the laser cavity is not a low-order multi-mode fiber or a series of low-order multi-mode fibers, among the modes included in the laser light propagating through the active fiber, a mode constituted by a radially polarized component resonates within the laser cavity and is then outputted to the outside of the laser cavity, without being attenuated by the mode filter. On the other hand, among the modes included in the laser light propagating through the active fiber, a mode including a linearly polarized component or an azimuthally polarized component is attenuated by the mode filter, so as to be hardly outputted to the outside of the laser cavity. Thus, the above configuration provides a further effect of making it possible to emit radially polarized laser light without use of a microbend fiber grating.

In the laser oscillator of the present invention, it is preferable that the active medium is a multi-mode fiber or a series of multi-mode fibers capable of guiding the waveguide mode having the specific polarization state, both ends of the active medium (the multi-mode active fiber or the multi-mode active fibers) being terminated by a mirror and a half mirror, respectively.

According to the above configuration, it is possible to connect the active fiber (multi-mode fiber) and the mode filter (long-period fiber grating) with each other by fusion. Thus, the above configuration provides a further effect of making it possible to easily realize a robust laser oscillator.

In a case where the mode filter is a mode filter for selectively attenuating any mode other than the radially polarized mode, even if an intensity of radially polarized laser light to be emitted is increased, a nonlinear optical phenomenon hardly occurs. This is because that the radially polarized mode (TM01 mode) propagating through the active fiber (multi-mode fiber) has an annular intensity distribution in which an intensity is low at a position close to an axis of the optical fiber and is high in a position surrounding the position close to the axis. Therefore, the above configuration provides a further effect of making it possible to realize a higher power output.

In the laser oscillator of the present invention, it is preferable that each of the mirror and the half mirror is a fiber Bragg grating.

According to the above configuration, by writing, to a multi-mode fiber, a grating for reflecting laser light propagating through the active fiber, it is possible to manufacture the mirror and the half mirror. The writing of the grating is can be performed by, e.g., emitting an ultraviolet ray to the multi-mode fiber including a core doped with germanium. Thus, the above configuration provides a further effect of making it possible to manufacture a highly-accurate mirror having a desired reflectance and a highly-accurate half mirror having a desired reflectance and a desired transmittance.

Furthermore, according to the above configuration, it is possible to connect (i) the active fiber (multi-mode fiber) and (ii) the mirror and the half mirror (fiber Bragg gratings) with each other by fusion. Thus, the above configuration provides a further effect of making it possible to easily realize a highly-accurate, robust laser oscillator.

Further, the mode filter of the present invention is a mode filter for selectively attenuating, among modes included in laser light, any mode other than a mode having a specific polarization state, the mode filter including a long-period fiber grating obtained by writing, to a multi-mode fiber which is capable of guiding a waveguide mode having the specific polarization state, a grating for selectively attenuating any waveguide mode other than the waveguide mode having the specific polarization state.

According to the above configuration, it is possible to manufacture a mode filter for selectively attenuating any mode other than the mode having the specific polarization state, by writing, to a multi-mode fiber which is capable of guiding the waveguide mode having the specific polarization state, a grating for attenuating any waveguide mode other than the waveguide mode having the specific polarization state. The writing of the grating can be performed by, e.g., emitting an ultraviolet ray to the multi-mode fiber including a core doped with germanium. This provides an effect of making it possible to manufacture a highly-accurate mode filter for selectively attenuating a desired waveguide mode, i.e., for selectively attenuating a mode having a desired polarization state.

[Additional Statements]

The present invention is not limited to the description of the embodiments above, but may be altered by a skilled person within the scope of the claims. An embodiment based on a proper combination of technical means disclosed in different embodiments is encompassed in the technical scope of the present invention.

For example, in the present embodiment, as shown in FIG. 2 (a), the optical fiber 2 has the cross-sectional configuration including the center region 21 having a disc shape, the high-refractive index region 22 having an annular shape and surrounding the center region 21, and the cladding 23 surrounding the high-refractive index region 22; however, the present invention is not limited to this. The same effects as those of the present embodiment can be achieved by any configuration, as long as the configuration (i) includes an optical fiber having different effective refractive indexes for respective polarized modes, (ii) makes a core of the optical fiber have a higher refractive index than that of a cladding of the optical fiber for obtaining a structure for confinement of signal light, and (iii) includes, in the core, a grating for modulating a refractive index. For example, even with a configuration in which a center region 21 is also doped with Ge, the same effects as those of the present embodiment can be achieved.

INDUSTRIAL APPLICABILITY

The present invention is suitably applied to laser oscillators for laser processing, and the like.

REFERENCE SIGNS LIST

1 Fiber laser (laser oscillator)
11 Light source
12 Mirror (fiber Bragg grating)
13 Multi-mode fiber (active medium)
14 Half mirror (fiber Bragg grating)
15 Mode filter (long-period fiber grating)
2 Optical fiber (multi-mode fiber)
3 Mode filter (long-period fiber grating)
31, 32, 33 Long-period fiber grating

The invention claimed is:

1. A laser oscillator comprising:
an active medium; and
a mode filter for selectively attenuating, among modes included in laser light which is generated by stimulated emission within the active medium and propagates through a laser cavity, any mode other than a mode having a specific polarization state,
the mode filter including a long-period fiber grating obtained by writing, to a multi-mode fiber which is capable of guiding a waveguide mode having the specific polarization state, a grating for selectively attenuating any waveguide mode other than the waveguide mode having the specific polarization state.

2. The laser oscillator as set forth in claim 1, wherein:
the long-period fiber grating included in the mode filter is obtained by writing, to a multi-mode fiber which is capable of guiding waveguide modes which are not higher than second order, gratings for selectively attenuating a HE11 mode, a TE01 mode, and a HE21 mode, respectively.

3. The laser oscillator as set forth in claim 1, wherein:
the active medium is a multi-mode fiber which is capable of guiding the waveguide mode having the specific polarization state, both ends of the multi-mode fiber being terminated by a mirror and a half mirror, respectively.

4. The laser oscillator as set forth in claim 2, wherein:
the active medium is a multi-mode fiber which is capable of guiding the waveguide mode having the specific polarization state, both ends of the multi-mode fiber being terminated by a mirror and a half mirror, respectively.

5. The laser oscillator as set forth in claim 3, wherein:
each of the mirror and the half mirror is a fiber Bragg grating.

6. The laser oscillator as set forth in claim 4, wherein:
each of the mirror and the half mirror is a fiber Bragg grating.

7. A filtering method comprising:
selectively attenuating, among modes included in laser light, any mode other than a mode having a specific polarization state, with use of a long-period fiber grating obtained by writing, to a multi-mode fiber which is capable of guiding a waveguide mode having the specific polarization state, a grating for selectively attenuating any waveguide mode other than the waveguide mode having the specific polarization state.

* * * * *